United States Patent

Petroff

[15] 3,663,138
[45] May 16, 1972

[54] HYDRAULICALLY CONTROLLED DRILL UNIT

[72] Inventor: Robert J. Petroff, 1703 S. Main St., Lombard, Ill. 61604

[22] Filed: Aug. 13, 1970

[21] Appl. No.: 63,569

[52] U.S. Cl. .......................... 408/130, 408/10, 408/72, 91/405, 60/54.5 R
[51] Int. Cl. ........................................................ B23b 47/22
[58] Field of Search .................... 408/130, 63, 702, 8, 10, 13; 91/405, 406; 60/10.5, 54.5 R

[56] References Cited

UNITED STATES PATENTS 3,299,783  1/1967  Mazue ........................... 408/130 X

*Primary Examiner*—Gil Weidenfeld
*Attorney*—Anderson, Luedeka, Fitch, Even and Tabin

[57] ABSTRACT

A drill unit adapted for controlled axial movement of a rotatable drill is hydraulically controlled so that the drill is rapidly advanced to the proximity of the workpiece and gradually fed into the workpiece. Large and small capacity flow control means are provided to regulate the rate of flow of a substantially non-compressible fluid from a quill and spindle assembly to fluid receiving means thereby controlling the rate of movement of the drill. Means are provided for forming a smooth bottom in the hole prior to retraction of the drill and for preventing intermixture of the substantially non-compressible fluid with compressed gas used in advancing and retracting the drill.

7 Claims, 6 Drawing Figures

Inventor
Robert J. Petroff
Anderson, Luedeka, Fitch, Even, & Tabin
Attys.

Inventor
Robert J. Petroff

HYDRAULICALLY CONTROLLED DRILL UNIT

The present invention relates to a drill unit. More particularly, the invention relates to an improved drill unit adapted for controlled axial advancement of a drill from a retracted position toward a workpiece.

As is well known, the operation of drilling a hole in a workpiece generally involves positioning a rotatable drill adjacent the face of the workpiece to be drilled, rotating the drill while advancing the drill forwardly so that a hole is formed in the workpiece, withdrawing the drill from the workpiece and retracting the drill from the position adjacent the face of the workpiece. In forming the hole in the workpiece, automatic or semi-automatic apparatus frequently is used to position the drill adjacent the workpiece, advance the drill therein, stop the advancement of the drill and reverse the operation so that the drill is retracted. Such apparatus is particularly useful in automated production and assembly lines wherein the workpiece is brought successively to various stations, at each of which stations a particular machining operation is effected and whereat the drill holes are to be accurately positioned in the workpiece. For example, a workpiece may be brought to a first station in which a drill is automatically or semi-automatically brought up to the face of the workpiece and then advanced into the workpiece to the desired depth, following which the drill is retracted. The workpiece is then conducted to a succeeding station in which a tapping head is positioned. Upon being secured in the succeeding station, the tap is advanced to the drilled hole in the workpiece and is rotated and advanced into the hole to the desired depth of the threads to be formed. The tap is then rotated in the opposite direction and withdrawn from the workpiece. Following this sequence of operations, the workpiece may be moved to other stations for further machining operations or it may be discharged from the line.

It is a primary object of the invention to provide an improved hydraulically operated drill unit in which the drill is advanced rapidly from a retracted position toward a workpiece and fed gradually into the workpiece. Another object of the invention is to provide a drill unit capable of drilling a hole having a smooth bottom in a workpiece. Yet another object is to provide a hydraulically controlled drill unit wherein the hydraulic fluid used in controlling the drill feed rate is prevented from admixture with compressed gas used in advancing the spindle in which the drill is received.

These and other objects and advantages of the invention will become apparent from the following description and accompanying drawing in which.

Figure 1:
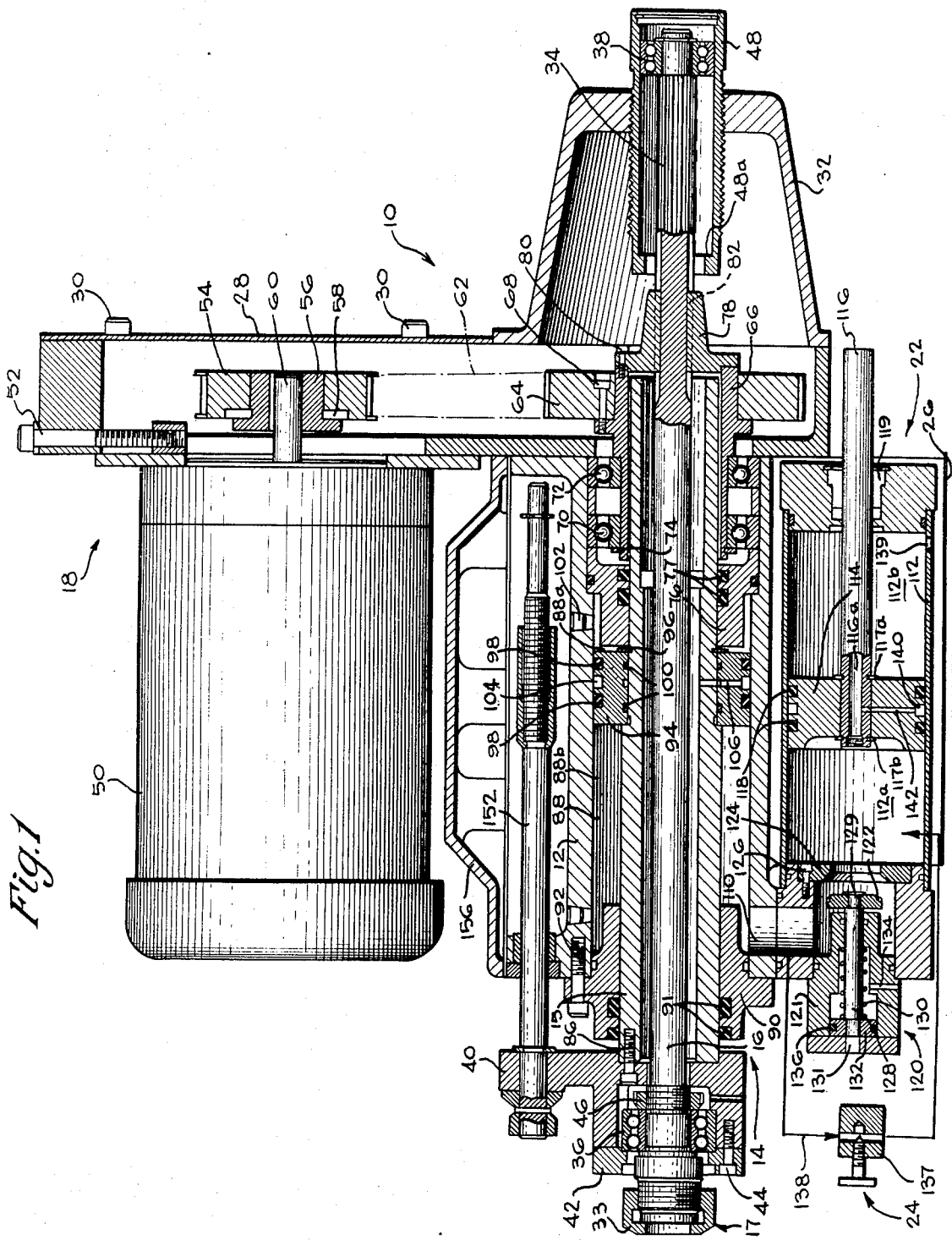
FIG. 1 is an elevational cross-sectional view of one embodiment of a drill unit chosen to illustrate the features of the present invention, shown with the drill in its fully retracted position.

Generally, and with reference to FIG. 1 of the drawing, there is provided in accordance with the present invention a drill unit 10 adapted for controlled axial movement of a drill from a retracted position within a housing 12 toward a workpiece. A quill and spindle assembly 14 including a quill 15 mounted for axial movement within the housing 12 and a spindle 16 rotatably mounted within the quill 15 and axially fixed with respect thereto is provided to axially advance the drill toward the workpiece. The spindle 16 has means 17 at its outer end for receiving the shank of a drill. In order to rotate the spindle 16 and the drill received therein so as to drill a hole in the workpiece, drive means 18 is provided. In fluid communication with the quill and spindle assembly 14 is fluid receiving means 22 for receiving substantially non-compressible fluid displaced from the housing 12 by advancement of the quill and spindle assembly 14. Flow control means 24 of both large and small capacity regulate the rate of flow of the fluid between the housing 12 and the fluid receiving means 22, thereby controlling the rate of advancement of the quill and spindle assembly 14 and the drill toward the workpiece and the feed rate into the workpiece, respectively.

More particularly, and with particular reference to FIG. 1 of the drawing, the embodiment chosen to illustrate the principles of the present invention includes the housing 12 that supports and partly encloses the quill and spindle assembly 14. The housing 12 rests upon a base 26 and a drive housing 28 that supports and partly encloses the drive means 18 is secured to the housing 12 by machine screws 30 or the like. A housing extension 32 is mounted on the drive housing 28 to support and partly enclose the rear end of the quill and spindle assembly 14.

The spindle 16 is rotatably mounted within the housing 12 such that the drill received at the outer end of the spindle is adapted to rotate within and form a hole in the workpiece. At the outer end of the spindle 16 is the receiving means 17, which is typically a chuck 33 adapted to engage and grasp the shank of the drill. The spindle 16 is desirably in the form of a tubular element having splines 34 at the rear end thereof. These splines 34 permit axial movement of the spindle 16 by the quill and spindle assembly 14 and continuous rotational movement of the spindle by the drive means 18. To support the spindle 16, there is provided a first bearing 36 at the forward end of the drill unit 10 and a second bearing 38 at the rear end of the unit. The forward bearing 36 is mounted within a torque arm 40 secured to the outer end of the quill 15 and has its outer race maintained within the torque arm 40 by an end bearing cap 42 mounted to the torque arm 40 by screws 44 or the like. A lock nut 46 secures the inner race of the bearing 36 to the spindle 14. Desirably, the bearing 36 is a thrust bearing and axial stresses between the quill 15 and the spindle 16 are carried by this bearing. Preferably, the rear bearing 38 has its outer race mounted within and axially movable with respect to a cup 48 threadably received in the housing extension 32. The inner race of the bearing 38 is mounted on and is axially fixed with respect to the spindle 16. The cup 48 can be manually or otherwise rotated by means of its threaded engagement with the housing extension 32 so as to axially define the limits of movement of the bearing 38 and its associated spindle 14. The cup 48 has an inner shoulder 48a that limits the movement of the bearing 38 within the cup 48 as the bearing axially moves with the spindle 16 so that the spindle 16 cannot advance beyond the desired distance into the workpiece. Thus, the cup 48 advantageously serves as an adjustable stop for the amount of forward advancement of the quill and spindle assembly 14.

The drive means 18 of the drill unit 10 rotates the spindle 16 and the drill with respect to the housing 12, regardless of the axial position of the spindle. The drive means 18 includes a motor 50 secured to the drive housing 28 as by machine screws 52 or the like. The motor 50 preferably provides continuous rotation, by means of the flow of air therethrough if the motor is pneumatic, so that the drill can immediately commence forming a hole upon entering the workpiece. It should be understood, however, that other types of motors, such as electric motors, can also be employed. The drive means 18 further includes a drive pulley 54 having a bushing 56 therein that is connected thereto by a key 58 and that engages the drive shaft 60 of the motor 50. A belt 62 or other force transmission apparatus is trained around the drive pulley 54 and also around a driven pulley 64 axially disposed about the rear end of the spindle 16.

In order to rotate the spindle 16, the driven pulley 64 is secured to a hub 66 axially surrounding the quill and spindle assembly 14, the pulley 64 being secured to the hub 66 by machine screws 68 or the like. The hub 66 is mounted for rotational movement within a pair of axially aligned bearings 70 and 72, the inner race of each bearing being secured to the hub 66 and the outer race of each bearing 70 and 72 being mounted within the housing 12. As the hub 66 is rotatably mounted within the housing 12 and as the hub 66 is keyed to the driven pulley 64, the hub 66 rotates in the same direction as the drive shaft 60 of the motor 50. A key 74 locks the bearings 70 and 72 to the hub 66 so that the hub is precluded from axial movement along with the spindle 16. The bearings 70 and 72 are themselves prevented from axial movement by a hub end cap 76 axially disposed within the housing 12 about the quill and spindle assembly 14 near the forward end of the hub 66 and having a shoulder engaging a corresponding shoulder within the housing 12. O-rings 77 are disposed between the hub end cap 76 and the quill 15 for sealing purposes. A cone 78 is secured to the opposite or rear end of the hub 66 as is the hub end cap 76 and is mounted to the hub 66 by screws 80 or the like. The cone 78 surrounds axially the spindle 16 and contains a plurality of longitudinal grooves 82 within a central bore. As aforesaid, the spindle has splines 34 at its rear end, the splines 34 being adapted to engage the grooves 82 within the cone 78. As the splines 34 engage the grooves 82 in the cone 78 and as the cone is mounted upon the hub 66, upon rotation of the hub 66 by the motor 50, the spindle 16 is rotated in the same direction as the drive shaft 60 of the motor. Although the splines permit the spindle 16 to move axially with respect to the hub 66, the splines prevent relative rotational movement between the hub 66 and the spindle 16.

The quill and spindle assembly 14 is adapted to rapidly advance the spindle 16 and the drill toward the workpiece. Partly comprising the quill and spindle assembly 14 is the quill 15 which is mounted within the housing 12 and which is axially movable with respect thereto. The quill 15 is preferably in the form of a hollow, tubular element surrounding the spindle 16 and secured at its forward end by machine screws 86 or the like to the torque arm 40 at the front of the drill unit 10.

The quill 15, together with the spindle 16 which is axially fixed thereto at the torque arm 40 and the bearings 36 and 38, is movable axially to rapidly position the drill carried in the chuck 33 in close proximity to the workpiece, and thereafter to permit the drill to be fed into the workpiece to the desired depth. These elements are adapted to rapidly retract after the drill has completed formation of the hole in the workpiece. The manner in which the axial movement of the drill is effected will next be described.

As shown in FIG. 1, an annular space 88 is provided between the quill 15 and the interior of the housing 12 that is enclosed at one end by a quill nose cap 90, mounted to the housing 12 by machine screws 92 or the like, and at the other end by the hub end cap 76. O-rings 91 are disposed between the quill nose cap 90 and the quill 15 to seal the annular space 88. This annular space is utilized as a cylinder in which a piston 94 is caused to move forwardly by the admission of compressed gas, such as air, to the rear side of the piston. The piston 94 divides the annular space 88 into first and second chambers 88a and 88b on either side thereof, the second chamber 88b being disposed between the piston and the workpiece. More particularly, the piston 94 comprises an annular member fixed to the quill 15. The piston 94 is secured against axial movement with respect to the quill 15 by a retaining ring 96 at one end of the piston 94 and by an interior shoulder of the quill which is engaged by the piston at the other end thereof. The retaining ring 96 is received within a peripheral groove in the quill 15. Packing 98 is received within a recess in the outer surface of the piston 94, the packing providing a relatively fluid-tight seal between the piston 94 and the inner wall of the housing 12. Furthermore, at least one O-ring seal 100 is received in a recess in the inner surface of the piston 94 to provide a relatively fluid-tight seal between the piston 94 and the outer wall of the quill 15.

A quill advancement inlet port 102 is provided in the housing 12 through which compressed gas, such as air, is admitted at a controlled rate and pressure to the first chamber 88a at the rearward side of the piston 94 to urge the piston 94, the quill 84 and the spindle 14 and their associated elements forwardly toward the workpiece. To prevent this compressed air from passing between the first chamber 88a and the second chamber 88b, there is disposed within the piston 94 a peripheral passageway 104 extending annularly about the outer surface of the piston. The passageway 104, which is in contact with the coacting inner surface of the housing 12, has a branch 106 extending transversely thereto through the piston 94 and the quill 15 into an annular space between the spindle 16 and the quill. The passageway 104 and the branch 106 serve to prevent compressed air that passes about the packing 98 from escaping beyond the piston 94 and to vent this compressed air into the atmosphere. For reasons which will be explained in more detail below, it is particularly undesirable for this compressed air to pass about the piston 94 into the portion of the annular space between the piston and the quill nose cap 90 which defines the second chamber 88b. It should be noted that the quill advancement inlet port 102 also serves as an exhaust port for the compressed air as the piston 94 retracts.

Leading from the second chamber 88b is a port 110 extending through the housing 12. The port 110 enters into the fluid receiving means 22 so that the second chamber is placed in communication therewith. The fluid receiving means 22 serves as a reservoir for substantially non-compressible fluid (hydraulic fluid), the fluid being disposed both in the fluid receiving means 22 and in the second chamber 88b. In operation of the quill and spindle assembly 14, as the piston 94 moves within the annular space 88, the hydraulic fluid contained within the second chamber 88b is displaced therefrom and passes through the port 110 into the fluid receiving means 22. Preferably, the port 110 is of sufficient dimensions that the hydraulic fluid in the second chamber 88b can rapidly enter into the fluid receiving means 22 through the port 110 in order that the quill 15, the spindle 16 and the drill rapidly advance to the face of the workpiece to be drilled.

The fluid receiving means 22 comprises, in general, a cylinder 112 in which a piston 114 mounted to a piston rod 116 is axially movable. The piston 114 divides the cylinder into third and fourth chambers 112a and 112b, the hydraulic fluid being contained in the third chamber 112a, which is disposed between the piston 114 and the workpiece. The port 110 enters the cylinder 112 on the third chamber side of the piston 94 so that the third chamber 112a is in fluid communication with the second chamber 88b in the housing. Admission of hydraulic fluid to the third chamber 112a causes the piston to move axially within the cylinder away from the workpiece. Packing 118 is received with a recess in the outer surface of the piston 114, the packing providing a relatively fluid-tight seal between the piston 114 and the inner wall of the cylinder 112. The piston rod 116 maintains the piston 114 in proper axial alignment, the rod 116 being secured to the piston 114 by keys 117a and 117b on either side of the piston. The piston rod has a central bore 116a therethrough and as the piston rod extends outwardly from the cylinder 112, a bushing 119 is desirably disposed therebetween.

In comprising the flow control means 24, there is provided a large capacity valve 120 at the port 110 between the second chamber 88b and the third chamber 112a to permit a high rate of flow of hydraulic fluid therebetween. When the valve 120 is open, the piston 94 and the quill 15 can advance within the housing 12 by displacing the fluid through the port 110 into the third chamber 112a. The large capacity flow control valve 120 comprises a valve housing 121, a valve element 122 and a beveled valve seat 124 disposed at the entrance to the third chamber 112a and secured to the cylinder 112 by a machine screw 126 or the like. The valve element 122 is adapted to engage the valve seat 124 in order to close the valve 120. The valve element 122 has a valve stem 128 connected axially thereto by a pin 129 and a compression spring 130 or other suitable device axially surrounding the valve stem for biasing the valve element into a normally open position. It is presently contemplated that the valve 120 be closed by admitting compressed gas through a port 131 to the valve housing 121 to move a piston 132 axially therein. The moving piston 132 is axially connected to the valve stem 128 and is adapted to compress the spring 130 to cause the valve element 122 to engage the valve seat 124 and thus to close the valve 120. A passageway 134 is provided in the valve housing 121 to allow the compressed gas admitted to escape to the atmosphere. Packing 136 is received in a recess within the piston 132.

After the spindle 16 and the quill 15 have advanced to a position adjacent the workpiece, the drill attached to the end of the spindle 16 is adapted to enter into and drill a hole in the workpiece. However, after the valve 120 is closed, the substantially non-compressible fluid is unable to flow from the second chamber 88b into the third chamber 112a. Hence, the quill and spindle assembly 14 cannot advance the drill into the workpiece. To permit gradual and constant feed of the drill into the workpiece, the flow control means 24 further comprises a small capacity valve 137 at the port 110 between the second chamber 88b and the third chamber 112a to regulate the flow of hydraulic fluid therebetween at a relatively slower rate than the valve 120. The valve 137 allows the fluid therethrough at a preselected and controlled rate and is typically a needle valve or the like. A bypass line 138 connects the port 110 and the third chamber 112a in the cylinder 112, the valve 137 being disposed in the line 138.

To retract the quill 15 and the piston 94 within the housing 12, compressed gas, such as air, is admitted at the rearward side of the piston 114 into the fourth chamber 112b through a quill retraction inlet port 139 in the cylinder 112. The compressed air admitted to the fourth chamber 112b forces the piston axially within the cylinder toward the third chamber 112a, thereby causing the hydraulic fluid to be displaced through the valve 120 and the port 110 into the second chamber 88b. This in turn causes the piston 94 to move within the housing 12 to retract the quill 15 keyed thereto and the spindle 16 associated with the quill.

As in the piston 94, a peripheral passageway 140 is disposed within the piston 114 annularly about the outer surface thereof. The passageway 140, which is in contact with the coacting inner surface of the cylinder 112, has a branch 142 extending transversely thereto through the piston 114 and the piston rod 116 into the central bore 116a of the piston rod. Thus, any compressed air admitted to the rearward side of the piston 114 that passes about the packing 118 will be vented through the passageway 140 and the branch 142 into the atmosphere rather than entering into the third chamber 112a. If the compressed air should enter the third chamber, the hydraulic fluid therein would become somewhat compressible. If the hydraulic fluid should become somewhat compressible, then the piston 94 will tend to float within the housing 12 during advancement and hence the quill and spindle assembly 14 will not repeatedly advance the drill to the desired distance within the workpiece.

In operation of the drill unit 10, starting from the fully retracted position shown in FIG. 1, the piston 94, the quill 15, and the spindle 16 and their associated elements advance rapidly within the housing 12 upon admission of compressed air to the first chamber 88a through the quill advancement inlet port 102 until the drill is in a position adjacent the workpiece. In order for the above-mentioned elements to advance relative to the housing 12, the hydraulic fluid is displaced from the second chamber 88b thereof, through the port 110, through the valve 120, and into the third chamber 112a of the cylinder 112, thereby moving the piston 114 within the cylinder 112 away from the workpiece. When this position adjacent the workpiece is reached, the valve 120 is closed and further passage of fluid therethrough from the second chamber 88b is prevented. However, the drill is continuously fed into the workpiece by the quill and spindle assembly 14 which displaces fluid from the second chamber 88b through the bypass line 138 and the valve 137 into the third chamber 112a. The rate of feed of the drill within the workpiece may thus be controlled.

When the drill has reached a preselected position within the workpiece, the bearing 38 at the rear of the spindle 16 engages the shoulder 48a of the cup 48 that serves as an adjustable stop. At this point of time, the admission of compressed air to the first chamber 88a is stopped and the chamber is opened to the atmosphere. However, the motor 50 continues to dwell for at least one revolution following engagement of the adjustable positive mechanical stop by means of a suitable time delay circuit (not shown). Retraction of the quill and spindle assembly 14 is delayed in order to provide a smooth bottom in the hole. The adjustable positive mechanical stop is particularly useful where the hydraulic fluid becomes somewhat compressible, thus causing the quill and spindle assembly to undesirably float. After the smooth bottom has been provided in the hole, the spindle 16, the quill 15 and the piston 94 are rapidly retracted from the workpiece by the controlled admission of compressed gas to the rearward side of the piston 114 in the fourth chamber 112b through the quill retraction inlet port 139. Substantially concurrently, the large capacity valve 120 again is opened and the fluid in the third chamber 112a is thereby rapidly displaced through the valve 120 and the port 110 into the second chamber 88b. This causes the piston 94 to rapidly retract within the housing 12 away from the workpiece carrying the quill 15 and the spindle 16 as well as the drill therewith.

Figure 2:
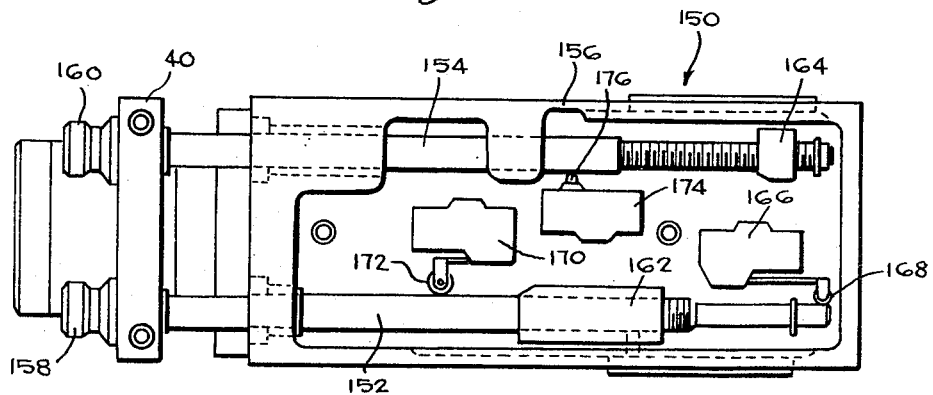
FIG. 2 is a cross-sectional view of the drill unit of FIG. 1 taken along the line 2—2 in FIG. 1.

Referring now to FIG. 2 of the drawing, there can be seen control means 150 for determining the periods of rapid advance of the drill to the workpiece, of feed of the drill into the workpiece and of rapid retraction of the drill from the workpiece. In the control means 150, the torque arm 40 is secured to the outer end of the quill 15 and extends upwardly therefrom. Two openings are provided in the torque arm 40 through which extend an advance screw 152 and a stop and retract screw 154. The screws 152 and 154 extend through openings in the housing 12 and into a portion thereof which is enclosed by a switch cover 156. Two knurled knobs 158 and 160 are provided on the outside of the torque arm 40 and permit the screws 152 and 154 to be turned, thereby positioning a feed actuator 162 axially on the partially threaded advance screw 152 and a stop collar 164 axially on the partially threaded stop and retract screw 154. A rapid advance switch 166 is secured to the housing 12 and has a follower 168 adapted to be actuated by the advance screw 152. A feed control comprising a three-way valve 170 having a follower 172 is also positioned on the housing 12 and is adapted to be actuated by the feed actuator 162 on the advance screw 152. Also, a stop switch 174 having an actuator arm 176 is mounted on the housing 12 and is adapted to be actuated by the stop collar 164 on the stop and retract screw 154. The operation of these parts of the control means 150 will next be described.

In FIG. 2, the control means 150 is shown in the position where the quill 15 and the spindle 16 are fully retracted within the housing 12. Thus, the follower 168 of the rapid advance switch 166 is engaged by the rear end of the advance screw 152. In this position, the switch 166 is actuated by the follower 168 and the drill unit 10 is ready to rapidly axially advance the drill to a position adjacent the workpiece. Compressed air is admitted from a suitable source (not shown) through the quill advancement inlet port 102 into the first chamber 88a within the housing 12. Admission of the compressed air causes the piston 94 to move within the housing 12, carrying with it the quill 15, the spindle 16 and the drill. As the advance screw 152 is associated with the quill 84 and the piston 94, it advances within the housing 12 therewith, the follower 172 of the three-way valve 170 riding thereupon.

Figure 3:
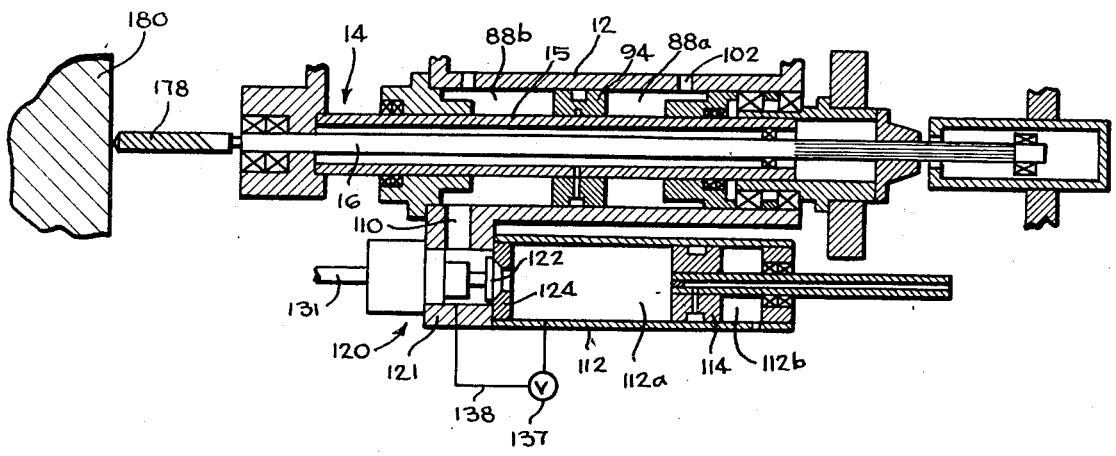
FIG. 3 is a simplified, elevational cross-sectional view of the drill unit of FIG. 1, showing the drill advanced to a position adjacent the workpiece.
Figure 4:
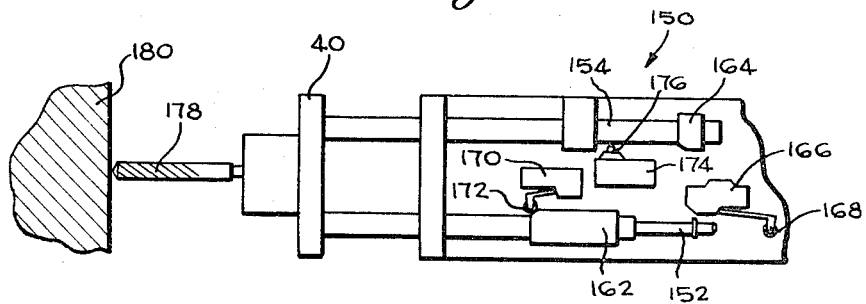
FIG. 4 is a simplified, fragmentary, cross-sectional view of the drill unit of FIG. 1, showing, in correspondence with FIG. 3, the drill advanced to a position adjacent the workpiece.

FIGS. 3 and 4 are simplified views of the drill unit 10 of the present invention at the position where the drill has been advanced such that it can be fed into the workpiece. As shown in FIG. 4, as the drill 178 approaches a position adjacent the workpiece 180, the follower 172 of the three-way valve 170 begins to ride up the beveled end of the feed actuator 162. The threeway valve 170, which may be also an electrical switch, thereby operates to admit compressed gas from a suitable source (not shown) to the port 131 in the valve housing 121 to seat the valve element 122 upon the valve seat 124, closing the valve 120 (FIG. 3). As the valve 120 closes, the fluid displaced from the chamber 88b through the port 102 advances the piston 94 within the housing 12 so as to feed the drill 178 into the workpiece 180. As shown in FIG. 4, the stop and retract screw 154 has also advanced within the housing 12, but has not actuated the stop switch 174.

In feeding the drill 178 into the workpiece 180, compressed gas is admitted through the port 102 to move the piston 94 forwardly within the housing 12 together with the quill 15 and the spindle 16. This causes displacement of the hydraulic fluid contained within the chamber 88b through the port 110 and the small capacity valve 137 into the third chamber 112a of the cylinder 112, thereby axially moving the piston 114 within the cylinder 112 away from the workpiece.

Figure 5:
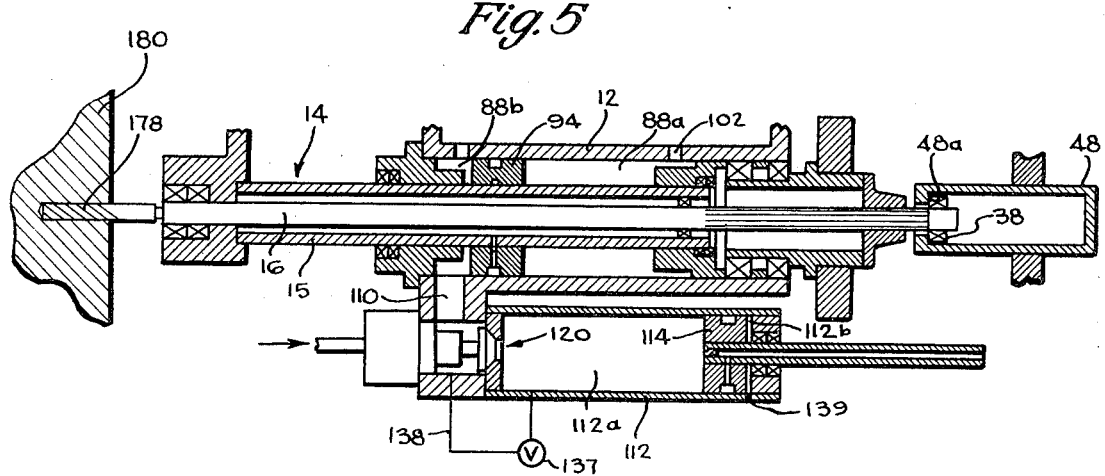
FIG. 5 is a simplified, elevational cross-sectional view of the drill unit of FIG. 1, showing the drill fully advanced to the desired depth of the hole in the workpiece.
Figure 6:
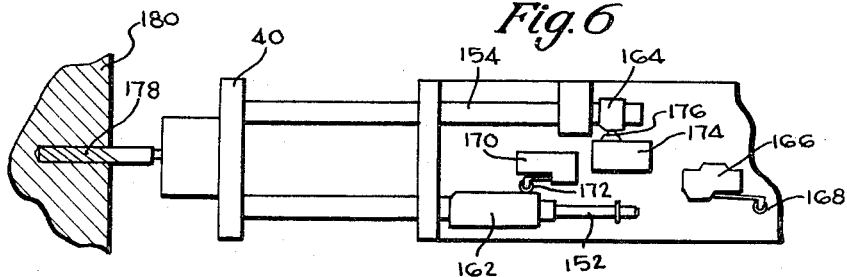
FIG. 6 is a simplified, fragmentary, cross-sectional view of the drill unit of FIG. 1, showing, in correspondence with FIG. 5, the drill advanced to the desired depth of the hole in the workpiece.

Next referring to FIGS. 5 and 6 of the drawing, which are simplified view of the drill unit 10 of the present invention at the position of maximum advance, it can be seen that the drill 178 has advanced within the workpiece 180 to form a drill hole of the preselected depth therein. At this point of maximum advancement, the bearing 38 mounted at the rear end of the spindle 14 engages the inner shoulder 48a of the adjustable cup 48 so that the drill 178 is precluded from further advancement within the workpiece 180. The cup 48 is adjustably positioned within the housing extension 32 in cooperating relationship with the stop collar 164, which is adjustably positioned upon the stop and retract screw 154. Thus, the stop can be set so that when the drill 178 reaches the desired forward position, the bearing 38 will engage the shoulder 48a of the cup and the stop collar 164 will substantially simultaneously engage the actuator arm 176 of the stop switch 174. As the stop switch 174 is actuated, the admission of compressed gas through the quill advancement inlet port 102 into the first chamber 88a is stopped and that chamber is opened to the atmosphere.

The switch 176 includes the time delay circuit (not shown) that controls the motor 50 so that it continues to rotate the spindle 16 and hence the drill 178 upon bottoming of the hole, the drill thereby providing a smooth bottom in the hole in the workpiece 180. After the motor 50 has dwelled for at least one revolution thereof, so that the drill provides the smooth bottom in the hole, compressed gas is admitted through the quill retraction inlet port 139 into the fourth chamber 112b in the cylinder 112, the compressed gas urging the piston 114 axially within the cylinder 112 toward the workpiece. Also after this short dwell, the large capacity valve 120 is opened. Hence, the fluid contained in the third chamber 112a is displaced through the valve 120 and through the port 110 into the second chamber 88b in the housing 12 to rapidly retract the piston 94, the quill 15, the spindle 16, and the drill 178 from the workpiece 180. The control means 150, which is associated with the quill 84 and which includes the advance screw 152 and the stop and retract screw 154, are also rapidly retracted from the workpiece. As the retracting advance screw 152 engages the follower 168 of the rapid advance switch 166, that switch is actuated to close the port 139, to open the port 102, and to begin another drilling cycle.

It should be apparent from the foregoing description that pneumatic and electrical systems are advantageously utilized for operation of the quill and spindle assembly 14, the drive means 18, the fluid receiving means 22, the flow control means 24, and the control means 150. Axial movement of the drill is thus automatically controlled by cooperating pneumatic and electrical control systems. Reference is made to a co-pending U.S. Pat. application, Ser. No. 837,093, filed June 27, 1969, for a "Lead Screw Tapping Head." In that application, pneumatic and electrical control systems are shown which could be readily modified by one skilled in the art to control the drill unit 10 of the present invention.

Thus, the present invention provides an improved drill unit that is hydraulically operated so that the drill can be advanced rapidly from a retracted position toward a workpiece and then fed into the workpiece. The invention further provides a drill unit capable of providing holes having a smooth bottoms in a workpiece. The invention also provides a hydraulically controlled drill unit wherein the hydraulic fluid used in regulating movement of the drill is precluded from admixing with the compressed gas used in advancing the spindle in which the drill is received toward the workpiece.

While one specific form of the invention has been shown and described, it should be apparent that various modifications could be made therein without departing from the scope of the invention. For example, the small capacity valve 137 could be a needle valve, a rotatable ball valve, a simple check valve, or any other suitable valve.

Various of the features of the invention are set forth in the following claims.

I claim:

1. A drill unit adapted for controlled axial movement of a drill from a retracted position toward a workpiece, comprising a housing, a quill mounted within said housing and axially movable with respect thereto, a spindle rotatably mounted in said quill and axially fixed with respect thereto, said spindle having means at its outer end to receive the shank of a drill, means for rotating said spindle, piston means fixed to said quill defining a first chamber and a second chamber on either side of said piston means between said housing and said quill, said second chamber being disposed between said piston means and the workpiece, a cylinder having a piston disposed therein dividing said cylinder into a third chamber and a fourth chamber, said second chamber and said third chamber being in fluid communication and containing a substantially non-compressible fluid, means for controlled admission of compressed gas to said first chamber whereby said piston means and said quill are urged toward the workpiece, large capacity flow control means disposed between said second chamber and said third chamber adapted to permit rapid flow of the substantially non-compressible fluid from said second chamber to said third chamber to thereby permit rapid advancement of said quill and said spindle toward the workpiece, control means responsive to the axial position of said quill and said spindle adapted to close said large capacity flow control means when the drill reaches a preselected position adjacent the workpiece, and small capacity flow control means disposed between said second chamber and said third chamber adapted to permit flow of the substantially non-compressible fluid from said second chamber to said third chamber at a preselected controlled slow rate relative to said large capacity flow control means to thereby permit the drill to be fed into the workpiece at a controlled rate.

2. A drill unit according to claim 1 further comprising adjustable positive mechanical stop means operatively associated with said spindle adapted to limit axial movement toward the workpiece of said spindle and the drill received therein.

3. A drill unit according to claim 1 further comprising means responsive to the axial position of said quill and said spindle adapted substantially concurrently to open said large capacity flow control means, to admit compressed gas into said fourth chamber, and to open said first chamber to the atmosphere when the drill reaches a preselected position within the workpiece to thereby effect rapid retraction of said quill and said spindle away from the workpiece.

4. A drill unit according to claim 1 further comprising adjustable positive mechanical stop means operatively associated with said spindle adapted to limit axial movement toward the workpiece of said spindle and the drill received therein, and means responsive to the axial operation of said quill and said spindle adapted substantially concurrently to open said large capacity flow control means, to admit compressed gas into said fourth chamber and to open said first chamber to the atmosphere when the drill reaches a preselected position within the workpiece corresponding to the limit of axial movement toward the workpiece effected by said adjustable positive mechanical stop means, whereby said quill and said spindle are rapidly retracted away from the workpiece.

5. A drill unit according to claim 4 in which said switch means includes a time delay circuit delaying retraction of said quill and said spindle away from the workpiece for at least one revolution following engagement of said adjustable positive mechanical stop means.

6. A drill unit according to claim 1 further comprising a peripheral passageway in said piston means at the coacting surfaces of said housing and said piston means and means venting said passageway to the atmosphere, whereby compressed gas which escapes from said first chamber is prevented from admixing with said substantially non-compressible fluid in said second chamber.

7. A drill unit according to claim 3 further comprising a peripheral passageway in said piston at the coacting surfaces of said piston and said cylinder and means venting said passageway to the atmosphere, whereby compressed gas which escapes from said fourth chamber past said piston is prevented from admixing with said substantially non-compressible fluid in said third chamber.

* * * * *